US007389447B2

(12) United States Patent
Norman

(10) Patent No.: US 7,389,447 B2
(45) Date of Patent: Jun. 17, 2008

(54) USER INTERFACE FOR AN EVENT MONITOR

(75) Inventor: Martin Norman, Cottenham (GB)

(73) Assignee: Tektronix, Inc., Beaverton, OR (US)

( * ) Notice: Subject to any disclaimer, the term of this patent is extended or adjusted under 35 U.S.C. 154(b) by 504 days.

(21) Appl. No.: 10/830,745

(22) Filed: Apr. 22, 2004

(65) Prior Publication Data
US 2004/0250171 A1   Dec. 9, 2004

(30) Foreign Application Priority Data
May 22, 2003  (GB) ................................ 0311808.0

(51) Int. Cl.
*G06F 11/00* (2006.01)
*G06F 11/30* (2006.01)

(52) U.S. Cl. ................................ 714/46; 714/45; 707/7
(58) Field of Classification Search .................. 714/46, 714/45; 709/224–226, 2; 707/2, 3, 5, 7
See application file for complete search history.

(56) References Cited

U.S. PATENT DOCUMENTS

| 5,737,600 | A  | * | 4/1998  | Geiner et al. ............... 707/200 |
| 5,740,354 | A  | * | 4/1998  | Ben-Natan et al. ............ 714/45 |
| 6,247,149 | B1 | * | 6/2001  | Falls et al. ..................... 714/45 |
| 6,353,902 | B1 | * | 3/2002  | Kulatunge et al. .......... 714/712 |
| 6,542,932 | B1 | * | 4/2003  | Brinnand et al. ............ 709/229 |
| 6,681,348 | B1 | * | 1/2004  | Vachon ......................... 714/45 |
| 6,690,274 | B1 | * | 2/2004  | Bristol ........................ 340/506 |
| 6,842,870 | B2 | * | 1/2005  | Austen et al. ................. 714/48 |
| 7,055,138 | B2 | * | 5/2006  | Sutton ......................... 717/125 |
| 7,103,664 | B1 | * | 9/2006  | Novaes et al. ............... 709/226 |
| 7,131,037 | B1 | * | 10/2006 | LeFaive et al. ............... 714/46 |
| 2001/0054097 | A1 | * | 12/2001 | Chafe ......................... 709/224 |
| 2002/0186259 | A1 |   | 12/2002 | Meandzija |
| 2003/0225872 | A1 | * | 12/2003 | Bartek et al. ............... 709/223 |
| 2005/0138483 | A1 | * | 6/2005  | Hatonen et al. ............. 714/45 |

FOREIGN PATENT DOCUMENTS

WO    WO 03/017640    2/2003

OTHER PUBLICATIONS

Glossary of the most common abbreviations used in standards for digital TV available at http://www.rohde-schwarz.com/www/downcent.nsf/ANFileBy  ANNoForInternet/ E6998EE7FF533FE0C1256B2800535A16/$file/7BM27_0E.pdf.*

(Continued)

*Primary Examiner*—Scott Baderman
*Assistant Examiner*—Joseph Schell
(74) *Attorney, Agent, or Firm*—Francis I. Gray; Michael A. Nelson

(57) ABSTRACT

A user interface for an event monitor that monitors a data stream receives an event message having at least one level of categorization, adds the event message to a log file, produces an alert status corresponding to a value of a component of the at least one level of categorization, selects the component of the at least one level of categorization, creates a filter according to filter criteria corresponding to the selected component of the at least one level of categorization, filters the log file to produce a filtered log file, and outputs the filtered log file containing event messages corresponding to the selected component of the at least one level of categorization.

6 Claims, 5 Drawing Sheets

OTHER PUBLICATIONS

Snapshot of Rohde & Schwarz DVM MPEG 2 Monitor System taken from IDS reference XP-002373954, available at http://www.rohde-schwarz.com/www/DownCent.nsf/file/n179__dvm100-120.pdf/$file/n179__dvm100-120.pdf.*

IBM Technical Disclosure Bulletin NN9502573 Common User Interface for Machine Diagnostics Feb. 1, 1995 vol. 38 Issue 2, p. 573-576.*

Glossary of the most common abbreviations used in standards for digital TV available at http://www.rohde-schwarz.com/www/downcent.nsf/ANFileByANNoForInternet/E6998EE7FF533FE0C1256B2800535A16/$file/7BM27__0E.pdf, unknown date.*

Snapshot of Rohde & Schwarz DVM MPEG 2 Monitor System taken from IDS reference XP-002373954, available at http://www.rohde-schwarz.com/www/DownCent.nsf/file/n179__dvm100-120.pdf/$file/n179__dvm100-120.pdf, unknown date.*

ANONYMOUS: "MPEG-2 Monitoring System R&S DVM100/R&S DVM 20" [Online] May 14, 2003, XP002373947 Retrieved from the Internet: URL: www.rohde-schwarz/com/www/download_files.nsf/file/DVM_web_en.pdf/$file/DVM_web_en.pdf> [retrieved on Mar. 23, 2006]p. 4.

[Online] XP002373946 Retrieved from the Internet: URL:http://www.rohde-schwarz.com/ (search term DVM)> [retrieved on Mar. 13, 2006] Downloads / Data sheets / MPEG-2 Monitoring System R&S DVM100/120—Data sheet (PD 0757.8513.21) May 14, 2003.

[Online] Jul. 2003, XP002373954 Retrieved from the Internet: URL:http://www.rohde-schwarz.com/WWW/Publicat.nsf/article/n179__dvm100-120/$file/n179__dvm100-120.pdf> [retrieved on Mar. 23, 2006] figure 6.

* cited by examiner

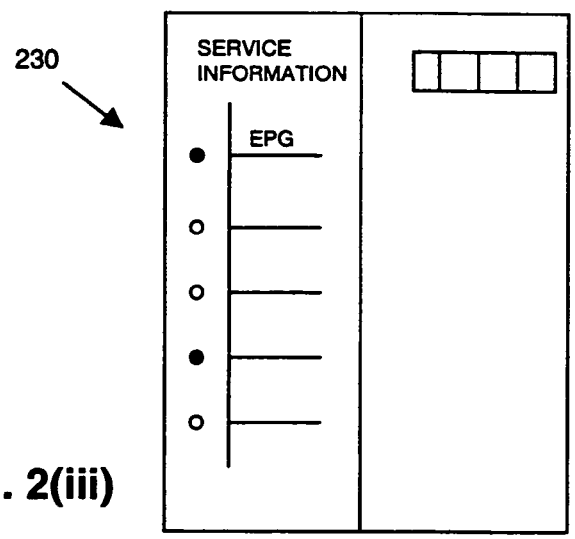
Fig. 2(iii)

USER INTERFACE FOR AN EVENT MONITOR

BACKGROUND OF THE INVENTION

The present invention relates to a user interface for an event monitor, and more particularly to a user interface using a navigation-based message log filtering technique for an event monitor, such as an MPEG (Moving Pictures Expert Group) transport stream event monitor.

As the digital TV market has grown, there has been an increase in the quantity of information transmitted in associated MPEG transport streams. Such information may include, for example, Electronic Program Guides (EPGS) which cover increasingly long periods of future programming, and interactive programs which have embedded applications. For analysis and monitoring tools this represents an increasingly difficult challenge in terms of minimizing time taken to isolate a fault. In addition, there is a requirement for users who are not expert in MPEG standards and tests to be able to isolate problems, particularly in a monitoring environment.

Known MPEG monitors or analyzers produce large message logs containing non-conformances, errors and general information for display to a user in as meaningful a manner as possible. The entries, or event messages, may be messages reporting errors of varying severity or reporting general information. Each entry in the message log is typically categorized, such as by content and/or test, etc., and the users filter the entries to display selected entries based upon selected components of the categories of interest. This approach requires that the users predetermine filter criteria from information gathered from experience and other features within the analyzer, such as the result of a particular conformance test. The message log is therefore used in isolation from the rest of the analyzer and has a single entry point.

What is desired is a user interface for an event monitor that provides a means for navigating through a message log to produce an automatically filtered group of event messages from the message log that are of special interest to users.

BRIEF SUMMARY OF THE INVENTION

Accordingly the present invention provides a user interface for an event monitor that receives and stores event messages in a message log, the event messages being related to events in a data stream being monitored. Each event message has at least one level of categorization associated with it, such as content, tests, etc. An alert status associated with a component of the at least one level of categorization also is stored. The component of the at least one level of categorization is selected, and a filter for the message log is created according to filter criteria corresponding to the selected component of the at least one level of categorization. The filter is used to filter the message log to produce a filtered log of event messages corresponding to the selected component of the at least one level of categorization for display. Preferably each event message is stored in a mini-log according to an event identifier and/or according to a secondary identifier corresponding to the component of the at least one level of categorization. For monitoring an MPEG transport stream, the at least one level of categorization includes at a first level a content group including program, packet identifier and service information and at a second level a tests group of test identifiers, or conversely at a first level a tests group of test identifiers and at a second level a content group including packet identifiers and/or programs.

The objects, advantages and other novel features of the present invention are apparent from the following detailed description when read in conjunction with the appended claims and attached drawing.

DETAILED DESCRIPTION OF THE INVENTION

Figure 1:
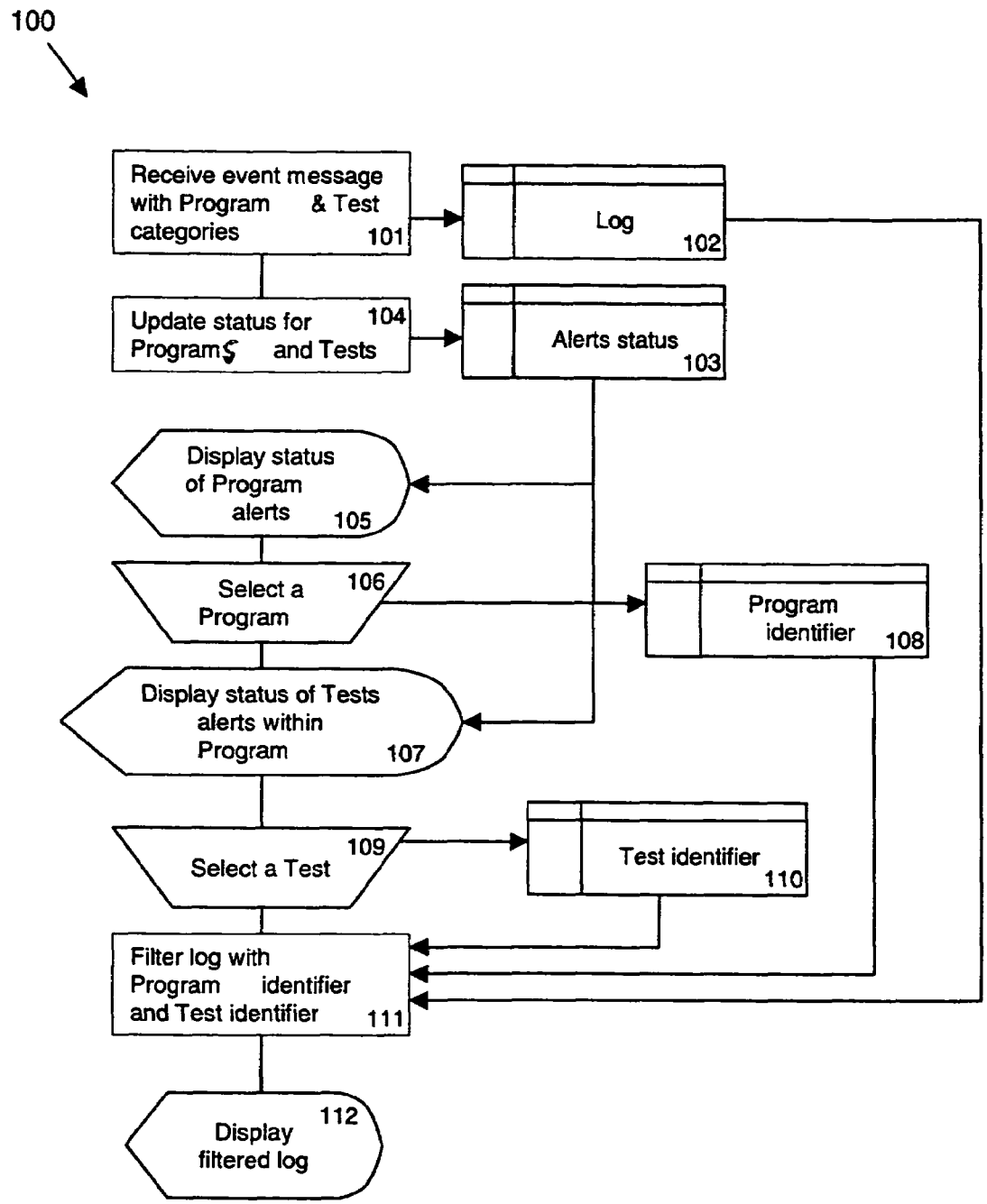
FIG. 1 is a flowchart of a user interface for an event monitor that monitors an MPEG transport stream according to the present invention.
Figure 2I:
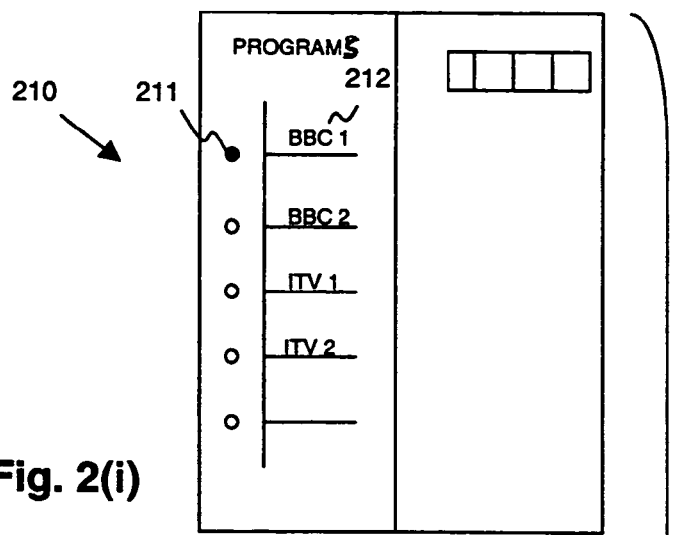
FIGS. 2(*i*)-2(*vi*) are diagrammatic representations of displays for the user interface of FIG. 1.
Figure 2:
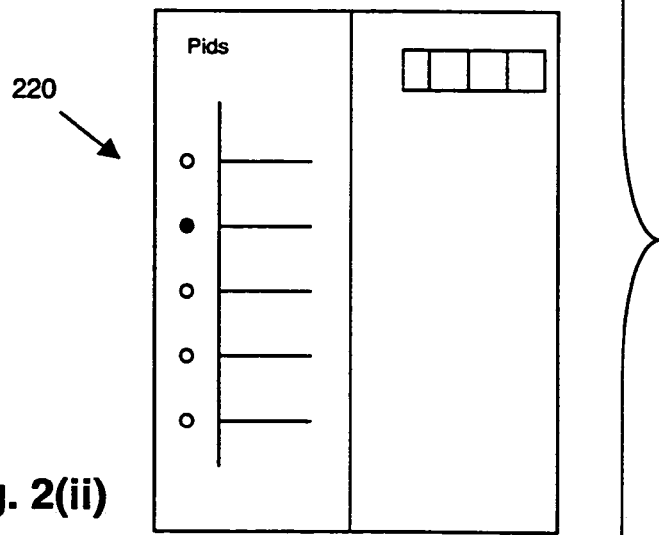
Figure 2:
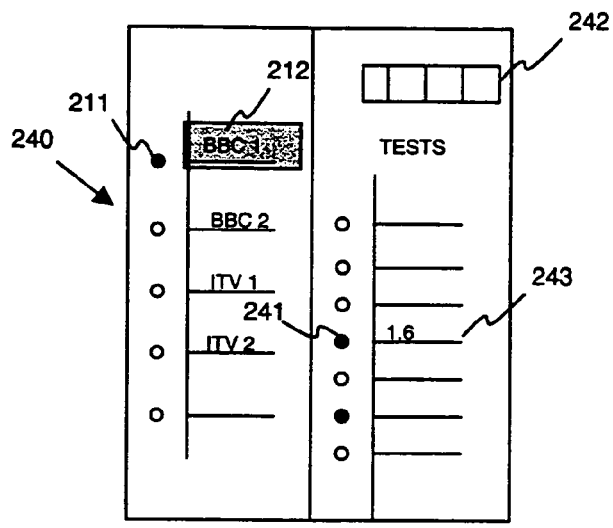
Figure 2V:
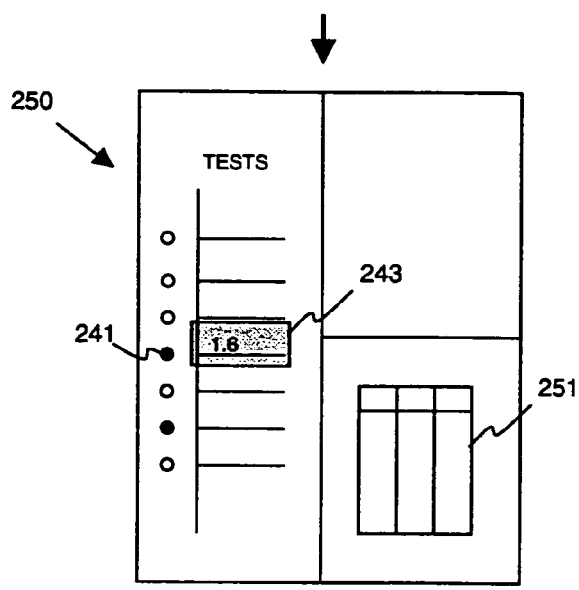
Figure 2:
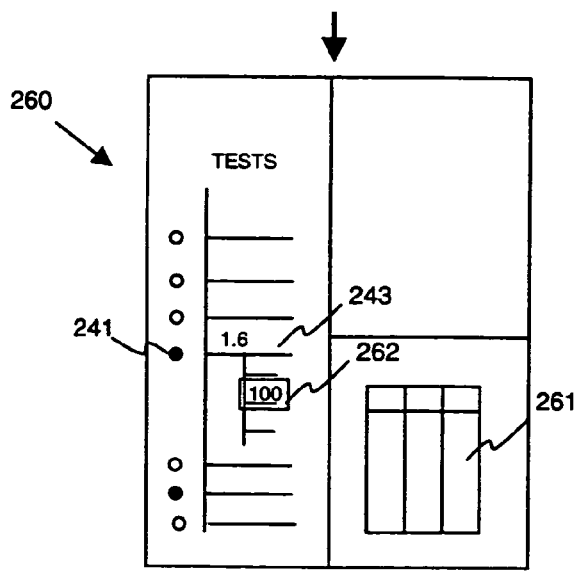

For ease of illustration, the invention is first described, by reference to FIGS. 1 and 2(*i*)-2(*vi*), in respect to the monitoring of an MPEG transport stream. Generically an event monitor includes a data processor, a storage device and a display. The data stream being monitored is acquired by an acquisition system and processed or pre-processed in real time by the data processor to generate event messages. The event messages are stored in the storage device as message logs for further processing. The final results of the further processing are then provided on a display device, usually in the form of virtual displays or screens.

As in the prior art referred to above, an analyzer for monitoring an MPEG transport stream for conformance with, for example, European Telecommunications Standards Institute (ESTI) standard TR 101 290, as applied to a DVB (digital video broadcast) system, generates a message log file 102 of event messages relating to conformance or otherwise to tests defined by the standard and to other elements of the MPEG transport stream. An initial screen at which an error is first noticed falls into one of two groups, Content 210, 220, 230 and Tests 250. Content refers to a screen that analyzes some aspect of the makeup of the transport stream. Examples are program 210, packet identifier 220 and system information 230. Tests refers to a screen 250 displaying the test identifiers of all conformance and other tests being applied to the MPEG transport stream. Navigation from the initial screen is then based upon the group to which the initial screen belongs.

Referring to FIG. 1 event messages are received, step 101, and the message log 102 is updated with each event message. As illustrated in the Content screens of FIGS. 2(*i*)-2(*iii*) respectively, tests may be applied to program streams, packet identifiers and service information. Considering, for example, the application of tests to program streams, an event message includes associated program and test categories indicating which test has been applied to which program in the program stream, as well as the result or other event message generated by the test. On reception of the event message, an alert status file 103 of the user interface is updated, step 104, with the current status of the test result for the program. Dependent on the current status of all the test results for a given program, an appropriate alert status 211 is displayed, step 105, on a display 210 of the transport stream analyzer for each program 212. That is, there is an SNMP (Simple Network Management Protocol) query for the user interface to determine the status of each test and consequently to display each alert status, which statuses are displayed as virtual LEDs (light emitting diodes) on a VDU (virtual display unit) for each program of the program stream. For example, if the programs have conformed to all tests to date, the alert status is green for each program; if any program did not conform to one or more tests on the most recent occasion on which the test was applied, the alert status for that program is red; and if any program did conform to all tests on the most recent occasions on which the tests were applied but did not conform to one or more tests on a previous occasion on which a test was applied, the alert status for that program is amber. That is, if a test is switched on, then the associated virtual LED is always on. The current state is represented by the LED color: green—no error; red—error; amber—previously in error but not at present; and grey (LED off)—test switched off or not relevant. A reset facility may be provided for re-setting the amber status LEDs to green, i.e., if the test has been run with no errors for a specified number of consecutive times, the virtual LED is switched to green.

If a program 212 showing non-compliance, i.e., LED is red, is selected, such as by highlighting the displayed name (BBC1) of the program on the screen as shown in Content Programs display 240 in FIG. 2(*iv*), the tests 243 which have been applied to that program are displayed, step 107, in a separate portion of the display 240 by selection of one of a number of tabs 242. When the program 212 is selected, step 106, a program identifier 108 is stored for subsequent use in displaying a filtered extract of event messages from the message log 102.

In a similar manner to the display of Programs (FIG. 2(*i*)), the tests 243 applied to the program stream are displayed in a Tests display 250 with their respective alert status 241, as shown in FIG. 2(*v*). When a test is selected, step 109, a test identifier 110 is stored and used in association with the program identifier 108 already stored to filter, step 111, the message log 102 to display, step 112, a filtered extract of event messages 251 from the message log containing only those event messages appropriate to the selected program and selected test. It is thus possible immediately to identify non-compliance resulting in the alert status of the program 212 and the test 243.

In an analogous manner, filtered message logs corresponding respectively to tests on packet identifiers, as shown in display 220 (FIG. 2(*ii*)), or to tests on service information, as shown in display 230 (FIG. 2(*iii*)), may be displayed.

Alternatively, a user may start from the Tests screen 250 as shown in FIG. 2(*v*) displaying the alert status of all tests applied to the MPEG transport stream. On selection of a test 243 of interest, the corresponding packet identifiers 262 are displayed, as shown in FIG. 2(*vi*). On selecting one of the packet identifiers, a filtered message log 261 corresponding to that test 243 and that packet identifier 262 is directly displayed by using stored identifiers of the test and the packet identifier to automatically filter the message log 102.

Therefore, the invention provides the advantage that in use, any fault may be isolated in three "mouse" clicks from any initial screen that first shows that the fault exists without requiring detailed MPEG knowledge. Fault isolation is here defined as displaying the filtered event messages from the message log that have caused an error or other alert to be reported. In other words, starting from a display screen 210, 220, 230 in the Content group, associated with each component 212 on the Content screen is a tests pane listing all tests 243 being applied to that particular component. A user therefore:

1. Selects a component 212 of interest from the Content screen, such as BBC1 from the Programs screen 210;
2. Selects a tests pane associated with the component using the tabs 242; and
3. Selects one of the tests 243 (the PCR error entry associated with the test identifier 1.6) causing auto-navigation to the Tests screen 250 (FIG. 2(*v*)), test and sub-test selection. An associated pane on the sub-test screen 260 (FIG. 2(*vi*)) displays the event messages 261 from the message log filtered on the test and sub-test criteria. A sub-test is typically a packet identifier, or possibly a program, determined by the original Content screen component selection.

Starting from a display screen in the Tests group, a Tests screen 250 displays all conformance tests, analyzer tests and possibly private tests that the user wishes. Upon the user observing an alert status 241 reporting an error (LED turns red), a user:

1. Selects a test 243 to view all event messages 251 from the message log 102 pertaining to that test—the LED for test identifier 1.6 indicates an error.
2. The user may select a sub-test (FIG. 2(*vi*)) to filter the message log to an individual packet identifier 262 or program (depending upon the test in question).

Figure 3:
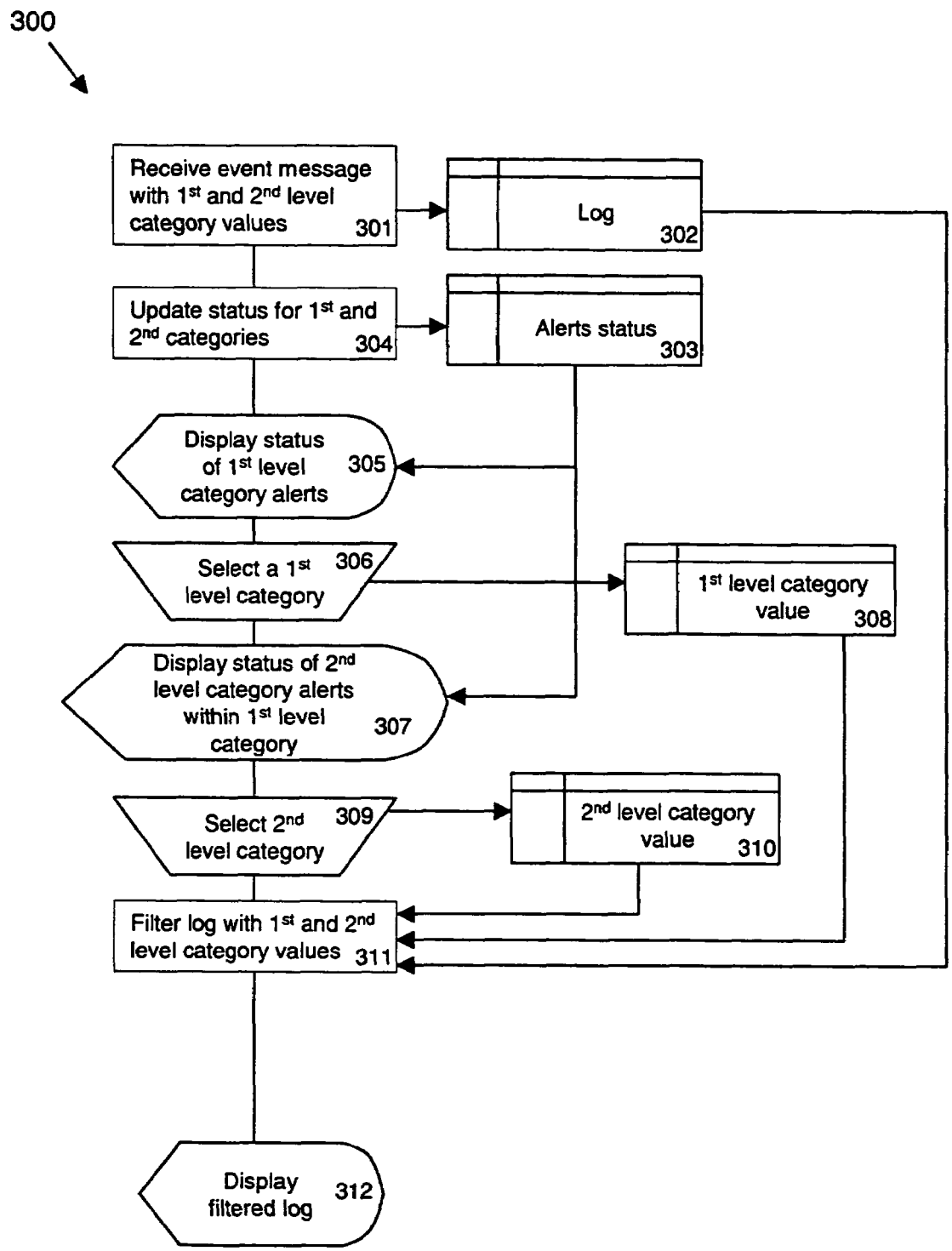
FIG. 3 is a flowchart of a generalized event monitor according to the present invention.

Although the invention has been described above in relation to monitoring an MPEG transport stream, the invention has general application to any logging system where large logging files are created which need to be accessed for particular logged events. A generalized application 300 of the invention is therefore illustrated in FIG. 3. An event message having a first and a second level category value is received, step 301, where the second level category has a hierarchical relationship with the first level category, and a log file 302 is updated with the event message. As a result of the reception of the event message, an alert status file 303 of a user interface may be updated, step 304, with the current values of the first level category and the second level category. Dependent on the current status of all second level category values for a given first level category, an appropriate alert status is displayed, step 305, for each first level category on a display of a user interface. That is, an SNMP query is generated for the user interface to determine the status of each first level category dependent on its hierarchically related second level categories, and consequently to display a corresponding alert status for the first level category.

If a first level category showing non-compliance is selected, step 306, for example by highlighting a displayed component of the first level category, the second level category corresponding to the first level category is displayed, step 307. When the highlighted component of the first level category is selected, step 306, a first component identifier 308 is stored for subsequent use in filtering the log 302. In a similar manner to the display of first level category, the second level category is displayed, step 307, with their respective alert statuses. When a second component from the second level category is selected, step 309, a second component identifier 310 is stored and used in association with the first component identifier 308 already stored to filter, step 311, the log 302 to display, step 312, a filtered log containing only those event messages from the log 302 appropriate to the selected first and second components. It is thus possible immediately to identify the events resulting in the alert status of the first and second level categories.

A further refinement may be provided by subdividing the message log file into derivative or mini-log files, for example by an event identifier or other secondary identifier associated with each event message. Consider again the example of monitoring an MPEG transport stream. Analysis and monitoring equipment have traditionally used a single message log to store all generated events. Manufacturers have endeavored to allocate increasing amounts of memory to increase the size of the log and therefore allow users to store events spanning a greater period of time. The log normally works in a cyclic fashion whereby, when the log is full, the newest entry overwrites the oldest one first. Various manual and automated methods have been employed to store the log contents before overwriting occurs. This may result in large amounts of disk space being consumed by log files that subsequently take a long time to analyze for a particular event or events of interest. Various filtering techniques have been used to isolate the user's focus of interest, but the more complex the filter criteria and length of the log, the greater the amount of time that is spent processing the log contents. However, it is possible to take advantage of the fact that, in most situations where large numbers of event messages are being logged, there are typically repeated occurrences of a same few error types. Simply increasing the size of the log only serves to increase the occurrences count, with only a marginally increased probability of capturing other rarer events of interest. Although most monitoring systems allow a user selectively to switch off tests which are known to generate many errors, it is not always known in advance which tests will generate excessive numbers of error messages and therefore which tests to switch off.

Figure 4:
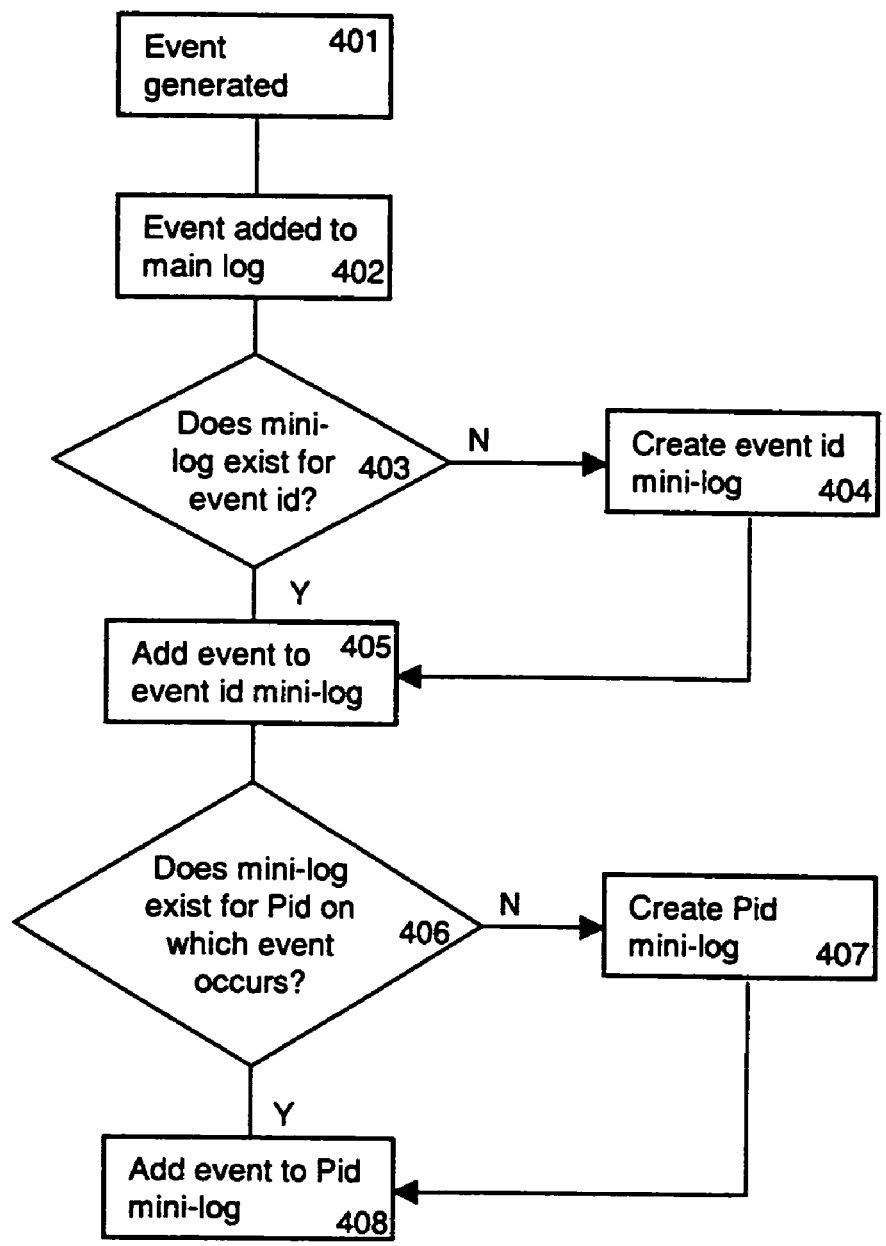
FIG. 4 is a flowchart of a method using derivative log files in the event monitor according to the present invention.

In order to mitigate this difficulty, in addition to maintaining a single log of all event messages, a series of mini-logs is also maintained, as shown in FIG. 4. In the case of an MPEG test system, a mini-log is created for each packet identifier that an event is raised against and a mini-log for each event identifier that contributes to a test failure or message. The event messages are generated, step 401, and stored in a message log, step 402. An event identifier in the event message is tested, step 403, to determine if a mini-log already exists for that event identifier and, if not, a new mini-log for that event identifier is created, step 404. The event message is then added to the mini-log corresponding to its event identifier, step 405. Then the packet identifier for the event message is checked to see whether a mini-log related to that packet identifier exists, step 406, and, if not, a packet identifier mini-log is created, step 407. Then the event message is added to the packet identifier mini-log, step 408 corresponding to its packet identifier.

Each mini-log has a predetermined maximum size of, say, 100 event messages. When the mini-log is full, new event messages simply overwrite the oldest ones first. Although there are potentially 8192 packet identifiers and about 1000 event identifiers in a standard MPEG transport stream subjected to a standard set of tests, in practice most transport streams use no more than 800 mini-logs. Memory is allocated for each new mini-log as it is generated in steps 404 and 407. If available memory is close to being full, then the 100 entry limit for each mini-log is gradually reduced. The User Interface (UI) then selects a mini-log to upload and display based upon the user's selection of test and packet identifiers of interest. This may entail the UI merging the contents of two mini-logs before displaying to the user. The advantage of this approach is that rarely occurring errors are captured, no matter how far in the past they occurred, while rapidly repeated errors are limited to a maximum of the 100 most recent occurrences.

The cost of this approach is that each event is stored in three separate logs—the message log, the event identifier mini-log and the packet identifier mini-log—and therefore consumes more memory. However in practice, because more useful information is stored, the length of the message log may be reduced, since less multiple occurrences of common messages are stored. Moreover, the message log is maintained purely for archival purposes and for downloading to, for example, disc storage. If this archive is not a requirement, only mini-logs need be maintained for displaying current alerts. Also, time-consuming filtering of the single message log may be avoided by instead selecting the complete appropriate mini-logs. That is, although the use of derivative mini-logs has been described in relation to automatic filtering of log files, it is apparent that such derivative mini-logs may be used independently of any filtering, with the mini-logs being displayed directly or in combination on the selection of corresponding criteria.

Thus the present invention provides an event monitor user interface, especially for MPEG transport streams, that allows a user to quickly navigate through a large event message log, selecting a first category of information for initial display, selecting a first component of the first category to display a second category related to the first category display, and finally selecting a second component of the second category display to display pertinent event messages that are automatically filtered from the message log according to the selected first and second components.

What is claimed is:

1. A method of providing a filtered message log for display for an event monitor that generates event messages from a data stream, the event messages having at least a first level category and a second level category related hierarchically to the first level category, comprising the steps of:

storing the event messages in a message log;

updating an alert status for the first level category in an alerts status log for each event message;

updating an alert status for the second level category in the alerts status log for each event message;

automatically filtering the event messages in the message log according to filter criteria determined by a first component and a second component to provide the filtered message log for display, the first component being selected from a display of the first level category based on the alert status for the first level category, and the second component being selected from a display of the second level category based on the alert status for the second level category, the display of the second level category resulting from the selection of the first component; and displaying the filtered message log on a display;

the storing step further comprising the steps of:

storing the event messages in a plurality of event mini-logs according to an event identifier associated with each event message, each event mini-log being associated with a different event identifier; and storing the event messages in a plurality of secondary mini-logs according to a secondary identifier associated with each event message each secondary mini-log being associated with a different secondary identifier.

2. The method as recited in claim 1 wherein the first level category comprises a content group, and the second level category comprises a tests group.

3. The method as recited in claim 1 wherein the first level category comprises a test group, and the second level category comprises a content group.

4. The method as recited in claims 1, 2 or 3 wherein the data stream comprises an MPEG transport stream.

5. The method as recited in claim 4 wherein the content group is selected from the group consisting of programs, packet identifiers and service information, and the tests group comprises tests for the MPEG transport stream.

6. The method as recited in claim 1 wherein the secondary identifier comprises a packet identifier when the data stream is an MPEG transport stream.

* * * * *